March 25, 1930. D. J. YOUNG 1,751,503
GAS MANUFACTURE
Filed March 26, 1926

Inventor
Daniel J. Young.

By Munson H. Lane.

Attorney

Patented Mar. 25, 1930

1,751,503

UNITED STATES PATENT OFFICE

DANIEL J. YOUNG, OF TACOMA, WASHINGTON, ASSIGNOR TO YOUNG-WHITWELL GAS PROCESS COMPANY, OF TACOMA, WASHINGTON

GAS MANUFACTURE

Application filed March 26, 1926. Serial No. 97,604.

This invention relates to gas manufacture, the present application being continuations in part of my co-pending applications as follows:—

Serial No. 570,207 filed June 22, 1922.
Serial No. 658,393 filed Aug. 20, 1923.
Serial No. 752,104 filed Nov. 25, 1924.
Serial No. 37,931 filed June 18, 1925.
Serial No. 41,733 filed July 6, 1925 and
Serial No. 56,201 filed Sept. 14, 1925.

Reference is made also to an application of George E. Whitwell, Serial No. 634,811, filed April 26, 1923, and an application of Frank W. Steere, Serial No. 637,159, filed May 7, 1923.

The invention relates, primarily, to apparatus for carrying out what is known as the "back run process" of manufacturing gas. The apparatus may also be employed for carrying on other than purely gas making operations, as for example, distillation processes, by-product recovery and the like. This apparatus primarily consists in slight modifications of the ordinary three shell water gas set, consisting of what is termed in the art, the generator, the carburetor and the superheater. As the invention is applicable, however, to the manufacture of gas other than the ordinary carbureted water gas, such, for example, as blue water gas, and producer gas, it is evident that the term "carburetor" should not be construed as implying, necessarily, the introduction of oil during the "back run". Instead of the term "carburetor" and "superheater", the terms "primary" and "secondary heat interchangers" may be substituted for the words "carburetor" and "superheater."

Figure 1:
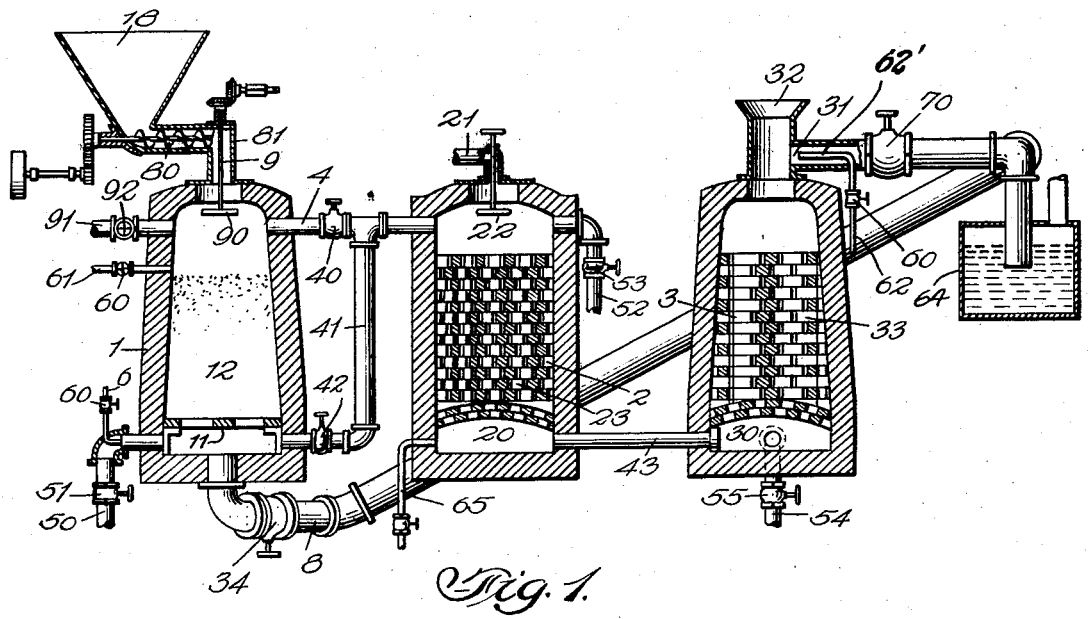
Fig. 1 is a central vertical section of the apparatus, certain parts being in elevation.
Figure 2:
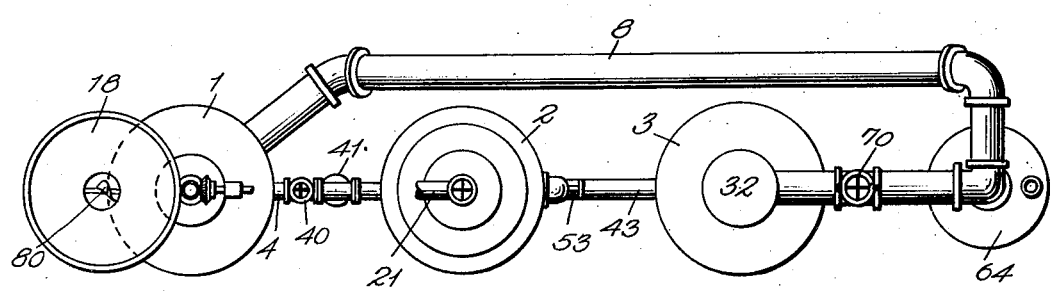
Fig. 2 is a top plan view of the apparatus.

The plant, as illustrated, is shown as comprising a combustible gas generator 1, a carburetor, or primary heat interchanger 2, and a superheater, or secondary heat interchanger 3. If desired, additional heat interchangers may be employed.

For example, a waste heat boiler of any desired type may be employed in connection with the set, for the purpose of utilizing the sensible heat of the outgoing gases for the generation of steam, as set forth, for example, in my application, No. 37,931, or if desired, an additional chamber containing checkerwork may be connected to the superheater, as set forth, for example, in my application, No. 56,201. Other types of regenerators than those disclosed therein may be employed if desired.

These parts are provided with the usual connections for the transfer of gas and air from one to the other. These connections comprise a pipe 4 connecting the upper parts of the generator and carburetor and containing therein a valve 40; a pipe 41 provided with a valve 42, connecting the pipe 4 with the lower part of the generator beneath the grate 11 and a pipe as 43 connecting with each other the chambers 20 and 30 contained at the bottom of the carburetor and superheater, respectively.

The upper part of the superheater is provided with the usual gas off-take connection, as at 31, leading to a wash box or seal pot 64, and also with a stack valve, as 32, which is open for the discharge of the gases formed during the air blasting run. The above features are substantially standard in construction of a water gas plant. The carburetor is also provided with means for introducing oil or other suitable enriching hydrocarbons at its upper end, this being represented by a pipe, as 21, and a nozzle as 22, which is placed just within the chamber of the carburetor. This is, or may be, also of standard construction.

A steam pipe 6 is provided for supplying steam to the bottom of the generator and a like pipe 61 for supplying steam above the fuel bed of the generator. Valves 60 control both of these steam pipes. These steam connections are, or may be, also of standard construction. Steam pipe 61 is used in making down runs, as is common in water gas generators. At such times the gas passes to the carburetor through pipe 41. A similar steam supply pipe 62 is placed at the discharge end of the superheater 3, this being peculiar to my invention. A gas off-take pipe 8 provided with valve 34 connects with the bottom of the generator and leads to the seal pot 64, this being also peculiar to my invention.

If desired, gas may be taken off at the top of the generator through pipe 91, a valve 92, being provided for controlling this offtake. This pipe may be likewise connected with the seal pot 64.

Air for use in blasting is supplied beneath the fuel bed of the generator through pipe 50 and is controlled by valve 51. Supplemental air supply pipe 52 connects with the upper part of the carburetor and is controlled by valve 53. A supplemental air pipe 54 connects with the bottom of the superheater and is controlled by valve 55.

In operating in accordance with the usual practice of a water gas plant, air would be introduced for a period beneath the grate 11, and would pass up through the fuel bed 12 during the blasting process. Supplemental air would also be introduced when desired through pipe 52 to the carburetor and pipe 54 to the superheater, as may be necessary for proper combustion. This supplemental air is controlled by valves 53 and 55. The products of combustion would be passed over through the pipe 4 to the carburetor, through the checkerwork 23 therein, taken through the pipe 43 to the superheater 3 and up through the checkerwork 33 therein and out through the stack valve 32, whereby heat would be stored in the checkerwork.

In the gas making run the air supply from pipes 50, 52 and 54, would be discontinued and steam introduced through the pipe 6 or pipe 61 according as the run was up or down. During this run oil would be introduced through the pipe 21 and the operation would be exactly in conformity with the usual gas making run of a water gas plant.

In carrying out my process the air blasting run is carried to a point where the fuel bed in the generator and the checkerwork in both the carburetor and the superheater are raised to a temperature equal to, or somewhat higher, than that which would be required by the operation of the usual water gas process.

Instead of following this blasting operation by the usual gas making run, in which steam is first passed through the fuel bed of the generator, I introduce steam at the top of the superheater as from a pipe 62 into the pipe 31, which is at the gas off-take end of the usual water gas plant. This stem is passed in a reverse direction to that usually employed, passing first through the superheater 3, thence through the carburetor 2, and then finally through the incandescent fuel in the generator where it is broken up, the resultant gas being taken out at the point as pipe 8, where air and base steam would normally be introduced to the generator, in carrying out the usual water gas process. This steam absorbs heat from the superheater and the carburetor until it is highly superheated. When it reaches the generator it comes in contact with the coal or other fuel which has been or is being introduced therein. This steam is sufficiently hot to volatilize some of the constituents of the coal and particularly so, if the coal be very finely reduced or powdered. The result when a high volatile fuel is used is the formation by distillation of a considerable amount of gas which is passed through the incandescent fuel and discharged through the pipe 8.

Figure 3:
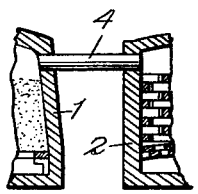
Fig. 3 is a fragmentary view in vertical section showing an alternative connection between the generator and the adjacent shell.

The offtake 91 may be used in taking off gas from back runs, in which case the course of the steam or other gas will be downwardly through the superheater, thence through the passage 43 to the carburetor 2, from the top of which it passes, then downwardly through the pipe 41 and valve 42 to the bottom of the generator, and upwardly through the fuel bed of the generator, the gas being taken off at 91. The offtake 91 may also be used when distillation of the fuel admitted at 90 is desired. In this case, the back run gas or steam from the carburetor is admitted through pipe 4 to the top of the generator, where it serves to extract the volatiles from the incoming raw fuel, and the carrier gas, laden with volatiles, may be discharged at 91, and, if desired, the volatiles extracted from the coal may be condensed or separated in any suitable manner. In this way, tars, benzols, ammonia, and other valuable constituents may be extracted from the coal, and the resulting coke falls upon the fuel bed of the generator, being available for water gas making. Steam or gas may also be admitted to the fuel bed at the bottom of the generator as at 6, and passed in an uprun through the fuel bed of the generator, and combustible gas withdrawn at 91. The improved apparatus is capable of performing any one of these operations, in any desired order. Another variation, which may be carried out with the present apparatus, is to admit steam or other gas to the top of the generator by means of the pipe 61, the steam or gas being passed downwardly through the fuel bed and withdrawn through pipe 8 to a place of storage or use. It is frequently desirable to carry out these variations, as in this manner more complete control of the fuel bed may be had, and utilization of the valuable by-products may be resorted to when it is desired to combine the gas making function with by-product recovery. Where it is desired to increase the quantity of ammonia obtained, a gas having a high nitrogen content is preferably used in the back run or up run.

Where the back run is employed any suitable and well known means for reversing the flow of gas through the entire plant may be employed. Ordinarily this result will be accomplished by the use of valves 34 and 70 which may be placed in the pipes 8 and 31 respectively in conjunction with the jet 62' at the end of pipe 62, or, if desired, seal pots of any suitable construction may be used. Obviously, by thus reversing the flow of gas through the plant as a whole the necessity for reversing the flow within the generator itself is avoided, and consequently the down-run steam line 61 and the hot valve 40 of the usual gas set, are rendered functionless or may be dispensed with entirely. Similarly, the valve 42 and pipe 41 of the old form of gas plant are rendered ineffective and may be eliminated, as shown in Fig. 3.

The steam in passing through the superheater and the carburetor comes in contact with any carbon which may have been deposited therein during the operation of the plant in the usual manner of a water gas plant. This carbon being highly heated and incandescent, combines with the steam to form gaseous oxides of carbon, thus securing two desirable results, one, the utilization of this carbon for making of gas, and the other, the prevention of clogging of the superheater and the carburetor with carbon with the resulting necessity of so frequently cleaning the same.

When the superheater and the carburetor have, by such a run as just described, been reduced in temperature to that which is most desirable for the operation of a water gas plant, this flow of steam is cut off and the usual flow of steam as customary in usual water gas operation is commenced through the fuel fed in the generator, the gas thereby formed passing on through the carburetor and superheater. During this run the supply of coal to the generator, if coal is the fuel, may be discontinued and the supply of oil to the carburetor commenced. When the fuel bed has been reduced to the minimum desirable temperature for gas making, this water gas making run is stopped and the air blasting run is started, after the usual manner of handling a water gas plant. Those versed in the art will recognize that the foregoing procedure is merely an example and that other operating methods are feasible with my apparatus.

The means for introducing coal or other fuel to the generator may be varied as desired and any apparatus used which is found suitable. Likewise, fuel may be introduced continuously or intermittently as desired. The apparatus illustrated consists of a hopper 18 for containing powdered coal, a screw feed 80 by which this is delivered in regular amounts to the charging pipe 81 by which it is admitted to the generator. It also includes a revolving shaft 9 to which is secured a disc 90 upon which the coal falls and from which it is discharged so as to be distributed instead of being all deposited at one point.

With the above apparatus operating in the manner described, the excess heat which has been found to be generated when coal is used for charging the generator, is utilized in the superheating of the steam and this in turn for the volatilization of the raw coal which is being charged in the generator, thus forming a certain amount of coal gas which is added to the water gas. This heat is therefore usefully used instead of being wasted, as has been the case in such apparatus when charged with coal and operated after the manner of usual water gas operation.

The passage of steam through the carburetor and the superheater of the usual water gas apparatus without first passing it through the generator is an effective manner of preventing clogging of these parts with carbon, as deposited carbon would thus be converted into gas. This is a desirable result and an improvement upon the former plan of operation which may be practiced whether or not the other steps of my process are employed.

If desired, steam may be admitted at other points than at the top of the superheater, as for example, through pipe 65 at the bottom of the carburetor or through the steam pipe 61 at the top of the generator. While the location of the pipe 62 is that preferred, other locations, as that of the pipe 65, nearer the generator, may be employed, the important feature being the introduction into the heated apparatus of a fluid capable of reacting with the incandescent fuel in the generator by the time the fluid reaches the fuel bed. In place of steam, water may be introduced into the system during the back run, the water as at 62 being converted into steam and superheated prior to its entrance into the fuel bed.

While for the manufacture of water gas, steam or water must be used in the back run, gases such as nitrogen, hydrogen, carbon dioxide, carbon monoxide, or atmospheric air may be substituted, these gases being superheated by their passage through the heat interchangers, and on coming into contact with the fuel bed, the heated gases serve to produce a combustible gas. Where an inert or non-oxidizing gas, as nitrogen, is used, the action is largely physical, serving as a carrier for heat, and distilling out the volatiles from the fuel.

Thus it will be seen that any gas stream may be used as a carrier of heat in the process, and this gas may be produced from the heat of the system itself by the introduction of a suitable liquid capable of being vaporized, such as water, oil or other fluid.

Obviously, where an inert gas is used, the fuel employed must be one containing volatiles, as bituminous coal, lignite, oil shale and other fuels of like characteristics. Where air is used, in place of steam, during the back run, it is obvious that the resulting product is producer gas. The apparatus may be employed for other than gas making operations, as for example, in distillation processes, for treatment of oil shale, and in ammonia manufacture.

While the drawings show a preferred construction, it is obvious that many changes may be made without departing from the spirit of the invention. For example, while valves 34 and 70 are shown in gas off takes 8 and 31, it is obvious that other means for controlling the flow through these passages may be employed if desired. If desired, also, a single valve could be used for this purpose, it being within the scope of the skilled mechanic to locate the valves at such positions as will best suit the needs of the individual case. A patent to Glasgow, et al., No. 581,909, shows the use of a single valve for controlling two independent passages leading to the wash box, and obviously a similar form of device may be used in connection with my apparatus for controlling the flow of gas through the passages 8 and 31. It is also obvious that the steam furnished to the system may be supplied from a single source, as for example, from a waste heat boiler, and that the flow of steam may be controlled by a single multi-way valve, if desired, in the manner shown in the Glasgow patent referred to above.

If desired, both the gas passages and the steam passages may be controlled from a single source, this being also common practice, as set forth in the Glasgow patent.

Other changes will occur to those skilled in the art, these being within the scope of the appended claims.

What I claim is:—

1. An apparatus of the character described, comprising a single gas generator, a single primary heat interchanger, a single secondary heat interchanger, and a wash box, the single units being connected in series and located in separate and detached shells, gas off-takes leading from the generator and secondary heat interchanger directly to the wash box, and means for introducing a fluid at both ends of the apparatus.

2. In an apparatus of the class described, comprising a single gas generator adapted to contain an incandescent solid fuel bed, a single primary heat interchanger, and a single secondary heat interchanger, connected in series in constant and uniform relation, the single units being located in separate and detached shells, means for passing steam into the apparatus, and means for withdrawing the resulting combustible gas directly from the apparatus at the top of the generator after passing through the fuel bed, said withdrawal means being independent of the connections between the individual units of the series.

3. An apparatus of the character described, comprising a single gas generator, a single primary heat interchanger, a single secondary heat interchanger, and a wash box, the single units being connected in series and located in separate and detached shells, and gas offtakes leading from the secondary heat interchanger and the generator directly to the wash-box, the offtake connection between the generator and the wash box being independent of all other units of the apparatus.

4. An apparatus of the character described, comprising a single gas generator, a single primary heat interchanger, a single secondary heat interchanger, and a wash box, the single units being connected in series and located in separate and detached shells, means for supplying steam to the generator, and gas offtakes leading from the secondary heat interchanger and the generator directly to the wash box, the offtake connection between the generator and the wash box being independent of all other units of the apparatus.

5. An apparatus of the character described, comprising a single gas generator, a single primary heat interchanger, a single secondary heat interchanger and a wash box, the single units being connected in series and located in separate and detached shells, means for supplying steam to the generator, gas offtakes leading from the generator and secondary heat interchanger directly to the wash box, and means controlling said offtakes.

6. An apparatus for the manufacture of carbureted water gas, comprising a single generator adapted to contain an incandescent solid fuel bed, a single carbureter and a single superheater, the single units being located in separate and detached shells and connected in series in constant and uniform relation, combustible gas offtakes leading from the superheater and generator to a wash box, and means for introducing an aqueous fluid at both ends of the set.

7. An apparatus for the manufacture of carbureted water gas, comprising a single generator, adapted to contain an incandescent solid fuel bed, a single carbureter, a single superheater, the single units being located in separate and detached shells and connected in series in constant and uniform relation, and a wash box, and combustible gas offtakes leading from the superheater and generator directly to the wash box.

8. An apparatus for the manufacture of carbureted water gas comprising a single generator adapted to contain an incandescent solid fuel bed, a single carbureter, a single superheater, the single units being located in separate and detached shells and connected in series in constant and uniform relation, and a wash box, means for supplying steam to the generator, and combustible gas offtakes leading from both the superheater and generator to the wash box.

9. An apparatus for the manufacture of carbureted water gas, comprising a single generator adapted to contain an incandescent solid fuel bed, a single carbureter, a single superheater, the single units being located in separate and detached shells and connected in series in constant and uniform relation, and a wash box, means for supplying steam to the generator, combustible gas offtakes leading from the generator and superheater to the wash box, and means for controlling said offtakes.

10. An apparatus for the manufacture of carbureted water gas, comprising a single generator, a single carbureter, and a single superheater, gas offtakes leading from the superheater and the generator to a wash box, and means for introducing water to the superheater.

11. In a carbureted water gas apparatus, comprising a single generator adapted to contain an incandescent solid fuel bed, a single carbureter and a single superheater, connected in series in constant and uniform relation, means for passing steam in a reverse direction through the apparatus and means for withdrawing the resulting combustible gas directly from the top of the generator.

12. In a carbureted water gas apparatus, including a single generator adapted to contain an incandescent solid fuel bed, and a single carbureter, connected in series in constant and uniform relation, said carbureter comprising a separate shell from said generator, and located substantially on a level therewith, means located at the bottom of the carbureter for introducing gas, means for reversing the direction of flow through the apparatus, and means for withdrawing combustible gas directly from the generator.

In testimony whereof I affix my signature.

DANIEL J. YOUNG.